J. Bird.
Glass-Ware Press.

N° 94,863. Patented Sep. 14, 1869.

Witnesses:

Inventor:
John Bird

United States Patent Office.

JOHN BIRD, OF PHILADELPHIA, PENNSYLVANIA.

Letters Patent No. 94,863, dated September 14, 1869.

IMPROVED PRESS FOR MOULDING GLASSWARE.

The Schedule referred to in these Letters Patent and making part of the same.

*To all whom it may concern:*

Be it known that I, JOHN BIRD, of the city of Philadelphia, in the State of Pennsylvania, have invented a new and useful Improvement in the Press for Moulding Glassware; and I do hereby declare that the following is a full, clear, and exact description of the construction and operation of the same, reference being had to the accompanying drawings, making a part of this specification, in which—

Figure 1:
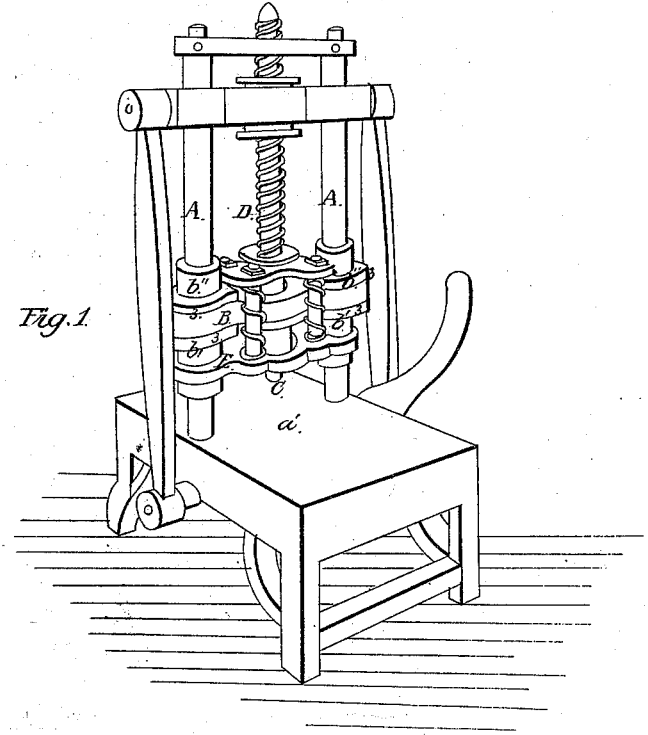

Figure 1 is a perspective view of the said improved press, and

Figure 2:
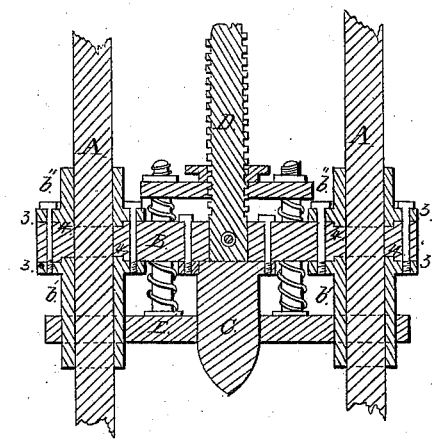

Figure 2, a vertical section of the improvement applied.

Like letters and numbers of reference indicate the same parts when in both figures.

In the operation of the presses in common use in moulding glassware, there is more or less inaccuracy in the required vertical motions of the plunger, and, consequently, objectionable irregularities in the form and thickness of the sides of any glass vessel produced thereby, and this inaccuracy in the motions of the plunger arises from the supposed necessity of making the lower portions of the guide-bearings of the plunger's cross-head very short, in order to allow the bearings in the ends of the lower spring-plate to receive and move properly upon, the usual standards or guides.

The object of my improvement is to obviate, or prevent this inaccuracy in the motions of the plunger; and also to facilitate in the repair or renewal of the bearings of the said cross-head; and My invention consists, substantially as hereinafter described, in so constructing and applying the bearings of the cross-head which carries the plunger, as to allow the bearings of the lower spring-plate to fit around and slide upon the outside of the lower bearings of the said cross-head, instead of sliding directly upon the guides or standards as heretofore, the said lower bearings of the cross-head being elongated downward for the purpose of affording the accuracy required in the motions of the cross-head, and also adapted, in construction and application, for the removal and reapplication, with facility, of the bearings of the cross-head, as occasion may require.

Referring to the drawings—

A A are the usual standards or bearing-guides of the press, secured in positions perpendicular to the platform $a'$;

B, the cross-head;

$b'$ $b'$, its lower bearings; and $b''$ $b''$, its upper bearings.

D, the operating-shaft of the cross-head B; and

E, the lower spring-plate.

In each end of the cross-head B, there is a roomy hole, which allows the cross-head to be easily slipped down over the standards A A.

The bearings $b'$ $b''$, in each end of the cross-head, are tubular, and made to slide up and down smoothly and accurately on their respective standards A A, and each has a flange, 3, around one end, whereby it is firmly bolted fast to the cross-head.

On the flanged end of each of said bearings, there is a longitudinally-projecting portion, 4, concentric with its bore, and fitting accurately in a corresponding concentric seat, made for the purpose, around in the hole in the cross-head, and the two sets of bearings $b'$ $b''$, being thus firmly bolted, respectively, together with the cross-head between, form the bearings for the respective ends of the latter.

The tubular portions of the lower bearings $b'$ $b'$ extend downward, nearly as low as the lower end of the plunger C, passing through the respective bearings or holes in the two ends of the lower spring-plate E, and serve as guides whereon the said plate may be accurately and smoothly moved up and down as usual during the operation of the press.

The plunger is adjustably bolted firmly to the under side of the cross-head, at a point directly beneath the lower end of the shaft D, and simultaneous motions in vertical directions given to the shaft D, cross-head B, plunger C, and spring-plate E, in the usual manner, the spring-plate E being arrested in its downward motion by coming in contact with the usual "ring" of a mould, and thus holding the said ring firmly down in place on the mould during the pressing of the glass in the same, and the withdrawal of the plunger C therefrom.

It will be seen, that as the lower bearings $b'$ $b'$ of the cross-head B are elongated, so as to extend down below the latter nearly as far as the plunger C, they will, in co-operation with the upper bearings $b''$ $b''$ and standards A A, effectually prevent any deviation from the required vertical line of motion of the plunger parallel with the standards A A, and, therefore, that the said plunger C will not be subject to the objectionable inaccuracies, before stated, in its operation upon the plastic glass in the mould, and that the spring-plate E will move as freely and accurately over the surface of the bearings $b'$ $b'$, as it did before over the surface of the standards A A.

It will also be seen that the bearings $b'$ $b''$, in consequence of the projections 4 4 and their seats in the cross-head, can be readily removed for repair, and replaced, or new ones substituted, so as to fit and serve with perfect accuracy, at trifling cost.

Having thus fully described my improvement,

What I claim as new, and desire to secure by Letters Patent, is confined to the following, viz:

1. I claim extending the lower portion of each of the bearings $b'$ $b'$, downward through and beyond the spring-plate E, substantially in the manner described and set forth, for the purpose specified.

2. I also claim the concentric projections 4 4, and the flanges 3 3, on the inner ends of the bearings $b'$ $b''$, in combination with the corresponding concentric seats around in the holes in the ends of the cross-head, as and for the purpose described, the said bearings and cross-head being adjustably secured together by means of screw-bolts or otherwise.

Witnesses:                             JOHN BIRD.

BENJ. MORISON,

WM. H. MORISON.